CALCULATOR FOR MAKING PATTERNS

Original Filed Oct. 28, 1968 8 Sheets-Sheet 1

CALCULATOR FOR MAKING PATTERNS

Original Filed Oct. 28, 1968 8 Sheets-Sheet 2

CALCULATOR FOR MAKING PATTERNS
Original Filed Oct. 28, 1968 8 Sheets-Sheet 3
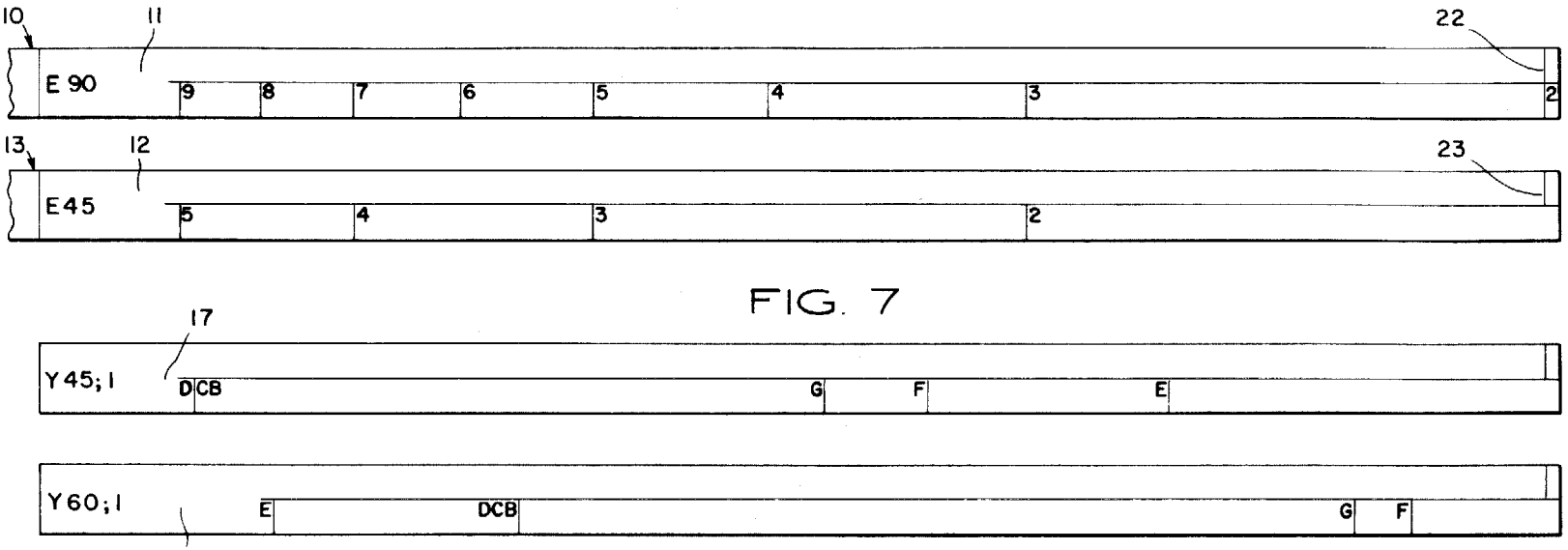
FIG. 7
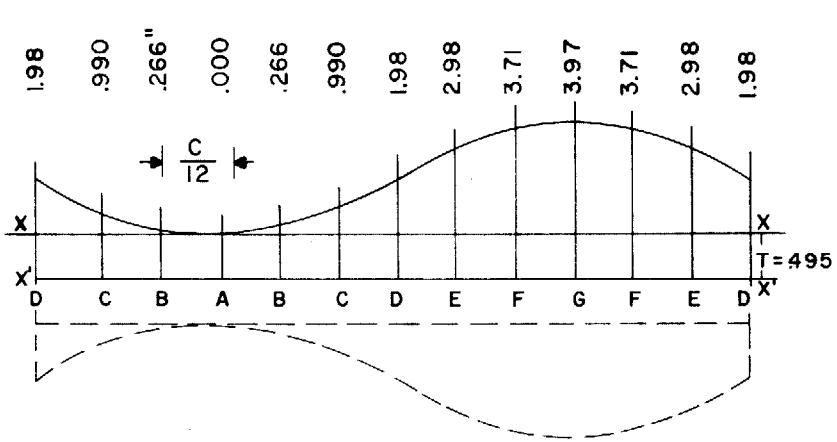
FIG. 9
FIG. 14C
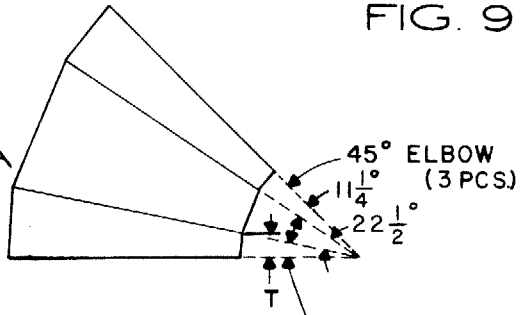
FIG. 14A
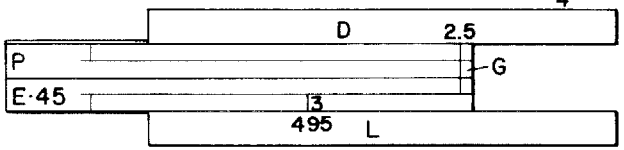
FIG. 14B

CALCULATOR FOR MAKING PATTERNS

Original Filed Oct. 28, 1968 8 Sheets-Sheet 4

CALCULATOR FOR MAKING PATTERNS
Original Filed Oct. 28, 1968 8 Sheets-Sheet 5
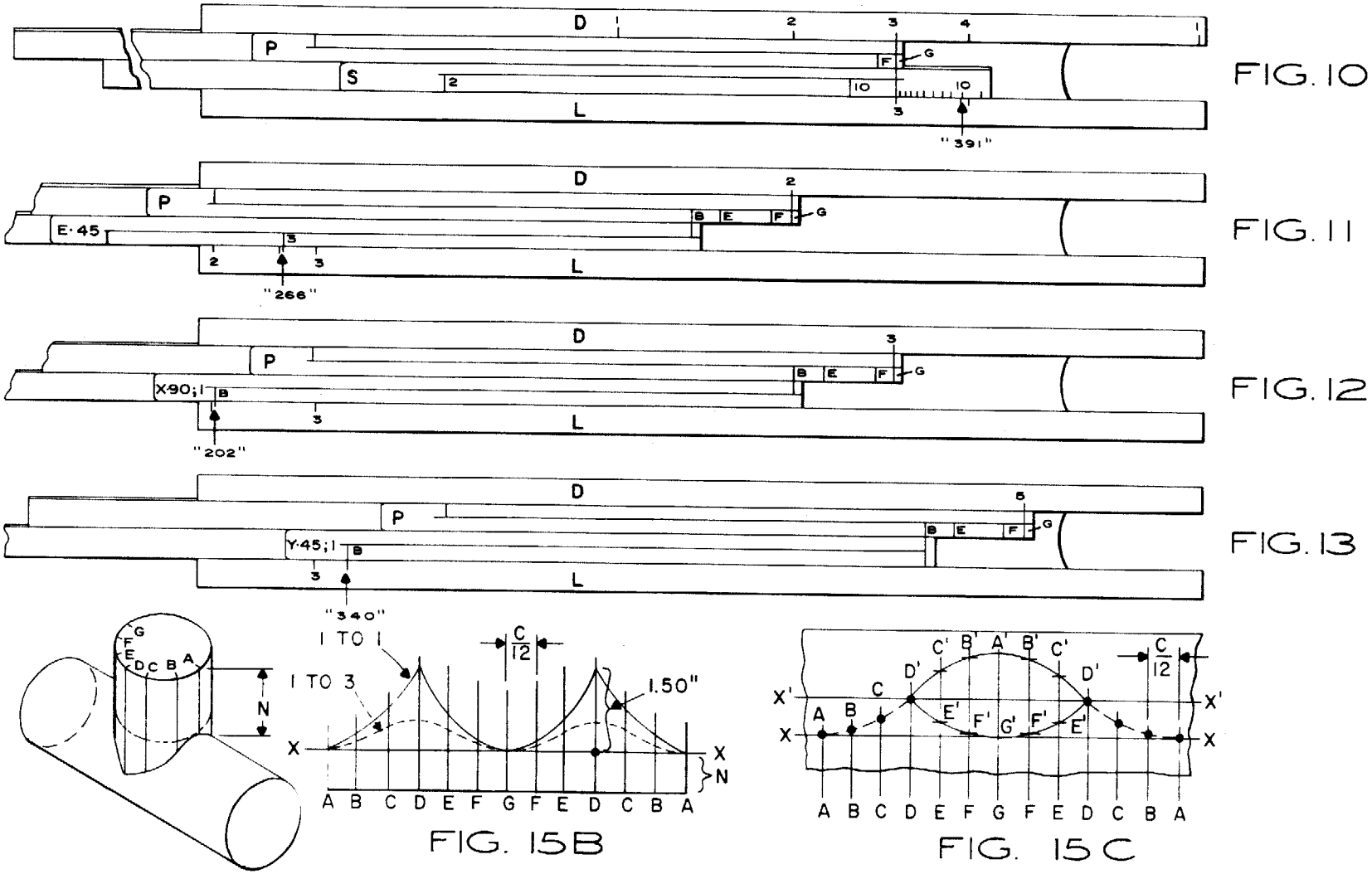

CALCULATOR FOR MAKING PATTERNS

Original Filed Oct. 28, 1968 8 Sheets-Sheet 6

CALCULATOR FOR MAKING PATTERNS

Original Filed Oct. 28, 1968 8 Sheets-Sheet 7

CALCULATOR FOR MAKING PATTERNS

Original Filed Oct. 28, 1968 8 Sheets-Sheet 8

United States Patent Office

Re. 28,033
Reissued June 4, 1974

28,033

CALCULATOR FOR MAKING PATTERNS

Joseph E. Hannon, 943 W. Greenbriar Lane,
Dallas, Tex. 75208

Original No. 3,572,583, dated Mar. 30, 1971, Ser. No. 771,187, Oct. 28, 1968. Application for reissue May 23, 1972, Ser. No. 256,186
Int. Cl. G06g *1/02*
U.S. Cl. 235—70 R 12 Claims

Matter enclosed in heavy brackets [ ] appears in the original patent but forms no part of this reissue specification; matter printed in italics indicates the additions made by reissue.

ABSTRACT OF THE DISCLOSURE

This disclosure provides a method and a tool for simplying the art of pattern making while simultaneously increasing the accuracy of the patterns made. One embodiment of this tool is a slide rule (known as a "pattern rule") so constructed as to directly compute and display the dimensions required in a pattern layout. By inserting the known dimensions and requirements into one area of the pattern rule by physically moving a sliding rule member, the desired dimensions are displayed in another area of the rule.

BACKGROUND OF THE INVENTION

1. Field of the invention

This invention relates to that class of tools that provides a tradesman with the facilities to increase his efficiency and improve the accuracy of his products, and more particularly to a slide rule to be used in making patterns for the sheet metal and pipe fitting industry.

2. Statement of the prior art

The prior art is exemplified by the following patents.

U.S. Pat. No. 621,348 to Keuffel discloses a slide rule that carries out the conventional function of slide rules by using a plurality of sliding bars simultaneously.

U.S. Pat. No. 2,190,472 to Ferrughelli discloses a proportional slide rule that may be used by pattern makers and architects as a "shrink" rule in which one scale is rigid and another is elastic or contractile. Direct proportional readings are possible using the different scales.

U.S. Pat. No. 3,135,464 to Quesenberry discloses a guide rule which has a replica of a scale of a layout board (jig) and a slideable member carrying scale markings so that the rule may be used for layout of stud and other dimensions from their cumulative distances from a selected corner.

In practice, the slide rule of this invention may be used to directly prepare patterns of at least the following sheet metal fittings; elbows, intersections, tees, Y-branches, cones, tapers, frustums, roof flashings, offsets, and also sheet metal parts having a miter line across any round pipe at any angle. Therefore, the slide rule of this invention may be identified according to its function and more specifically as a "pattern rule."

SUMMARY OF THE INVENTION

This invention comprises a slide rule which contains graduations so spaced that the required measurements for patterns may be obtained directly without the need for making conventional projection type drawings.

In the sheet metal trade, it has been a practice of many generations for a draftsman to meticulously lay out accurate patterns on drawing paper, and then to obtain a blueprint of the drawing and send the blueprint to a metal working shop where the pattern on the print will be transferred to a heavier template paper which will then be come the working pattern. The drawing paper (usually tracing paper) will then be retained in the event some future job will require repetition of the pattern developed.

Since the precise drawings required to develop a pattern require skills not usually present in the sheet metal worker who will use the drawing to make a pattern and then use the pattern to make the part, the skill of a professional draftsman is usually required for the initial steps of this process. However, the use of the pattern rule of this invention will permit the sheet metal worker to lay out his own pattern directly and in his own shop. The sheet metal worker can thus acquire the additional skill of total preparation of a sheet metal pattern.

Also by the use of this pattern rule, an unskilled worker can readily elevate his position to equal that of a skilled worker in many phases of the trade.

Prior to the instant invention, pattern making his involved the detailed steps of preparing orthographic drawings, auxiliary projections from the orthographic drawings, and the transfer of the dimensions obtained from the various projections to a pattern layout on the same drawing for a subsequent transfer of the pattern layout from the drawing paper to a heavier pattern or template paper.

In summary, this invention comprises a slide rule which contains graduations so precisely displayed that the required measurements for patterns may be obtained directly without the need for making certain conventional drawings normally required.

BRIEF DESCRIPTION OF THE DRAWING

FIGS. 7–9 are plan views of typical sliding scales identified as series E, X and Y;

FIG. 10 is a plan view similar to FIG. 1 wherein sliding scales P and S have been moved to positions illustrative of their functions;

FIGS. 11–13 are views similar to FIG. 10 illustrating the operation of sliding scales E, X and Y;

FIG. 14A shows a 45° sheet metal elbow for which a pattern is desired;

FIG. 14B is a diagrammatic view of the pattern rule of FIG. 11 in operation in a manner to provide the line T necessary for the elbow pattern layout of FIG. 14C;

FIG. 14C is a design layout for a pattern of an elbow produced from the operation of sliding scales P and E and showing progressive steps utilized in achieving this pattern. The solid portion is the pattern for each end segment, and the solid portion plus the dotted portion is the pattern for the center segment of the elbow;

FIG. 15A shows a sheet metal intersection or T-fitting in outlined form;

FIG. 15B is a design layout for a pattern of the intersecting T produced from the operation of sliding scales P and X; the dotted lines representing the same type pattern as the solid lines but for a fitting having different diameters;

FIG. 15C is a design layout for a pattern of the pipe portion of the T of FIG. 15A;

FIG. 24 is a diagrammatic view showing how representative scales are physically constructed in making the pattern rule of this invention.

FIG. 24 is divided into two principal parts, FIGS. 24A and 24B;

Principle of the pattern rule

Figure 1:
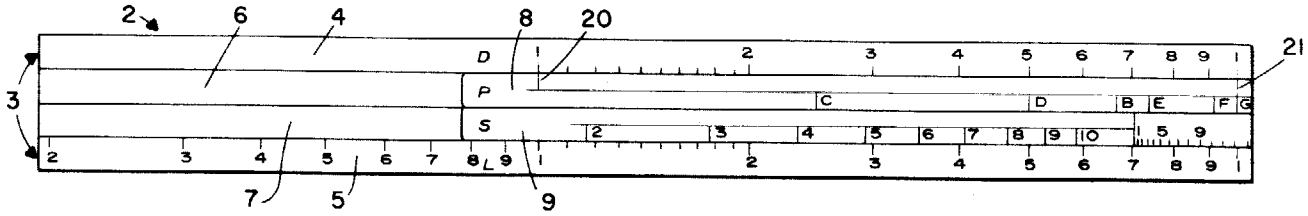
FIG. 1 represents a plan view of the operating side of the assembled pattern rule of this invention with sliding scales P and S installed in the rule.
Figure 2:
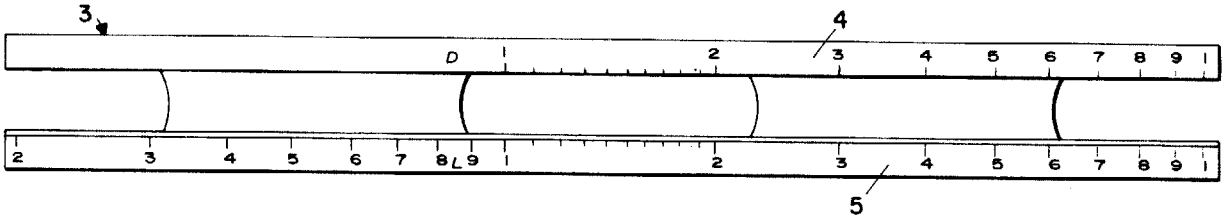
FIG. 2 is a plan view of the pattern rule frame of the device of FIG. 1 with all sliding scales removed.
Figure 3:
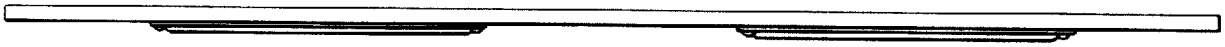
FIG. 3 represents a top edge view of the rule of FIG. 1.
Figure 4:
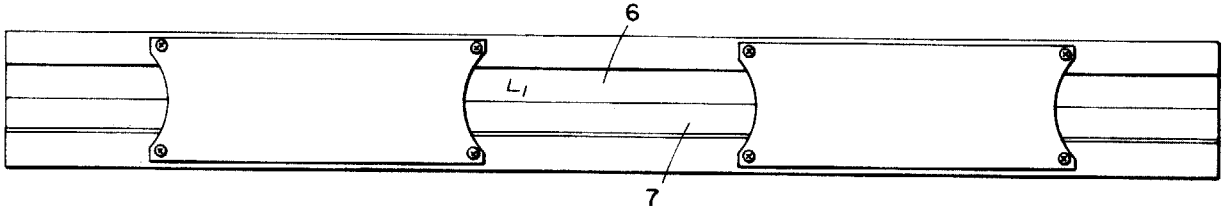
FIG. 4 is a back view of the rule of FIG. 1.
Figure 5:
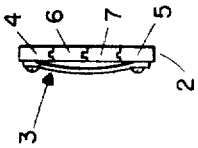
FIG. 5 is an end edge view of the rule of FIG. 1.

FIG. 6A shows a plan outline view of an elbow segment on which auxiliary construction lines have been superimposed to demonstrate the principle by which the pattern rule of this invention is able to function to produce true length pattern lines for round pipe and fittings therefor.

FIG. 6B shows a first segment of an elbow, and FIG. 6C shows the half-pattern for the first segment of an elbow, that was developed to show the principle on which this invention is based.

For the purpose of producing pattern lines, the applicant has chosen to divide the pipe circumference into 12 parts by points A–G and B′–F′ and draw vertical lines through these points that are perpendicular to the diameter AG as seen in FIG. 6(A). Applicant has noted that the circumference of any pipe (and any circle) may be divided into 12 equal parts by scribing an arc of 0.5233 radian. Therefore a fixed relation is seen established between the point A on the circumference and each of the chords B–B′, C–C′, etc., drawn perpendicular to the diameter AG.

For example, in FIG. 6A it is seen that the distance from A to each chord B–B′, etc., may be specified as a fixed percentage of the diameter where A is 0 percent, and G is 100 percent (this is true regardless of the diameter of the circle).

When the points A–G are projected onto the segment of FIG. 6B it is seen that the distance from point A to each vertical pattern line B, C, etc., is the same percentage of the diameter as the chords of FIG. 6A. Further it is seen in FIG. 6B that all of the vertical lines B–G are vertical legs of right triangles whose horizontal legs are a fixed percentage of the pipe diameter.

Each vertical line B–G is proportionate to its horizontal distance from A because a series of proportional triangles are formed that have a coincident hypotenuse, a coincident base and a common included angle, and therefore each triangle has the same identical tangent.

In FIG. 6B it is also seen that the tangent of the included angle is the same as that of segment angle SA and equals the vertical line G–G″ divided by the diameter A–G″. This provides a finite dimension (the tangent of angle SA) from which each of the other vertical lines B–F, etc. can be obtained. The segment angle SA is known or easily determined from the degree of the elbow and the number of segments required in the elbow, i.e., a 45° elbow having three segments would have a first segment angle of one-half of the result of 45° divided by two, or one-half of 22½° which is 11¼° (see FIG. 14A).

The throat length is determined in a similar manner since this length (T in FIG. 6B), is the opposite side of a triangle with the same angle SA, and with a base equal to the throat radius. The definition of the tangent of an angle is, that it is the ratio of the opposite side to the adjacent side. Hence in this instance the formula is:

$$\text{tan of angle SA} = \frac{T}{\text{throat radius}}; \text{ therefore}$$

$$T = (\tan SA)\ (\text{throat radius})$$

and since both the angle SA and the throat radius are known, the equation is solvable for T.

Thus the applicant has discovered that the true length of the pattern line may be calculated from its relationship to the pipe diameter for any given fitting, and has devised a slide rule by which the calculation may be performed.

Referring now more particularly to the characters of reference on the drawing, it will be observed that the pattern rule of this invention, identified at 2, comprises a stationary case or frame 3, including two fixed scales 4 and 5, which according to their particular layout and function are known as D- and L-scales, and according to their location, may be referred to as upper and lower fixed scales, respectively. Between the fixed upper and lower scales are located upper and lower parallel sliding members 6 and 7 which, as seen in FIG. 1, may include scales P and S, referenced 8 and 9 respectively, on one side or face thereof. Member 7 may be replaced by another sliding member 10 (FIG. 7) which includes scale E–90, identified at 11. Another scale E–45, identified at 12, is located on an additional sliding member 13. An additional scale L1, with graduations corresponding to those on the L-scale may be located on the back of member 6 so that the rule may be used for arithmetic functions. Also, additional sliding members may be supplied to include scales X–30; 1, X–30; 1.5, X–30; 2, X–30; 2.5, X–30; 3, X–45, 1, X–45; 1.5, X–45; 2, X–45; 2.5, X–45; 3, X–60; 1, X–60; 1.5, X–60; 2, X–60; 2.5, X–60; 3, X–67.5; 1, X–67.5; 1.5, X–67.5; 2, X–67.5; 2.5, X–67.5; 3, X–90, 1, X–90; 1.5, X–90; 2, X–90; 2.5, X–90; 3, representative scales being shown in FIG. 8. In FIG. 9 additional represenative scales, Y–45; 1 and Y–60; 1, are shown and will be employed where the pattern job requires them. The X-scales are identified generally as 16, and Y-scales are identified generally as 17.

The disclosure of the structure comprising the complete pattern rule of this invention may be seen from the following specific description of each type of scale employed, and an itemized set of operating instructions, whereby the reader will be able to understand both the physical configuration of the rule and how and why the various members of the structure cooperate to provide the desired and highly beneficial result.

The D-scale identified at 4 in FIG. 1 is the "diameter" scale from which all solutions of all patterns begin. This scale is laid out logarithmetically and numbered from 1 to 10. The numbers themselves correspond to the same values, and they would be read in the same manner as numbers on the familiar C- and D-scales of a conventional engineer's slide rule, and similarly, the operator must keep track of the decimal points and must recognize that three primary numbers in the answer are the limit of accuracy to be expected in the range from 2 through 10, and four primary numbers may be obtained between 1 and 2.

The L-scale, identified at 5 in FIG. 1, is the scale from which the true "lengths" of all lines used in making the patterns are taken. This scale is laid out logarithmetically in two sections; the first section is numbered from 2 to 10, and the second section is numbered from 1 to 10. These numbers and values are read in the same manner as the D-scale 4.

Figure 6:
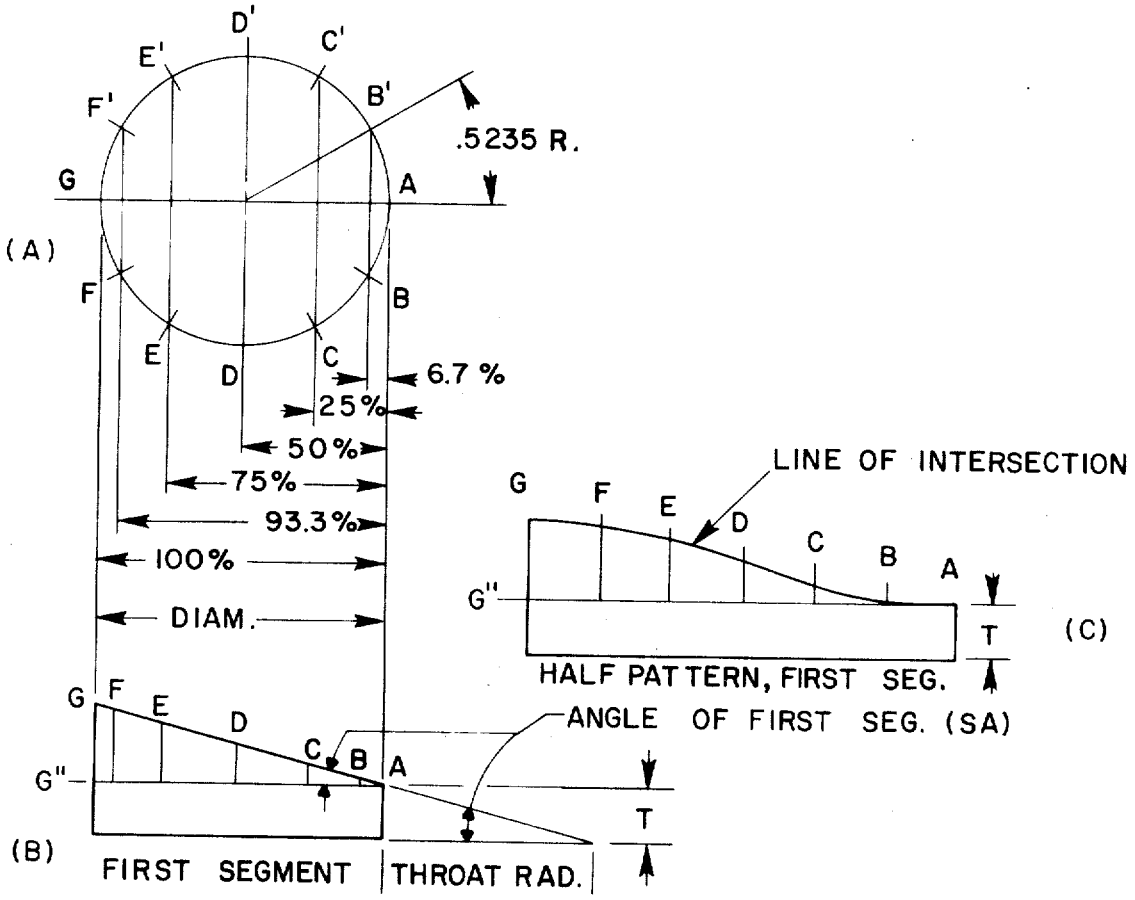
FIG. 6 is an elevational view of a first segment of an elbow with a projected layout plan view and a developed half-pattern, illustrating one of the principles on which the pattern rule functions.

The P-scale, identified at 8 in FIG. 1, is used in the development of all "patterns." The P-scale operates adjacent the D-scale and includes index markers 20 and 21 to cooperate with a selected number (the diameter desired) on the D-scale. The remaining markers on the P-scale are identified by the letters C, D, B, E, F and G in that order, and these letters correspond to specific lines on the pattern layout (FIG. 6). The numerical value of the length of the pattern lines C, D, etc., are read on the L-scale in a manner hereinafter described.

The E–90 scale, identified at 11 in FIG. 7, and located on sliding member 10 is used in the development of 90° elbows of from two to nine segments, and it includes an index marker 22 at the right on its upper half, and includes markers identified by the number 2—9 (representing the number of segments in the finished elbow) on its lower half. The index marker 22 of this scale will be set to the desired pattern line (B, C, etc.) on scale P above.

The E–45° scale identified at 12 in FIG. 7 and located on sliding member 13 is used in the development of 45° elbows of from two to five segments. This scale includes an index marker 23 at the far right on its upper half, and markers 2—5 (representing the number of segments) on its lower half. This scale will duplicate the location and operation of the E–90° scale when the work product is a pattern for a 45° elbow.

Figure 8:
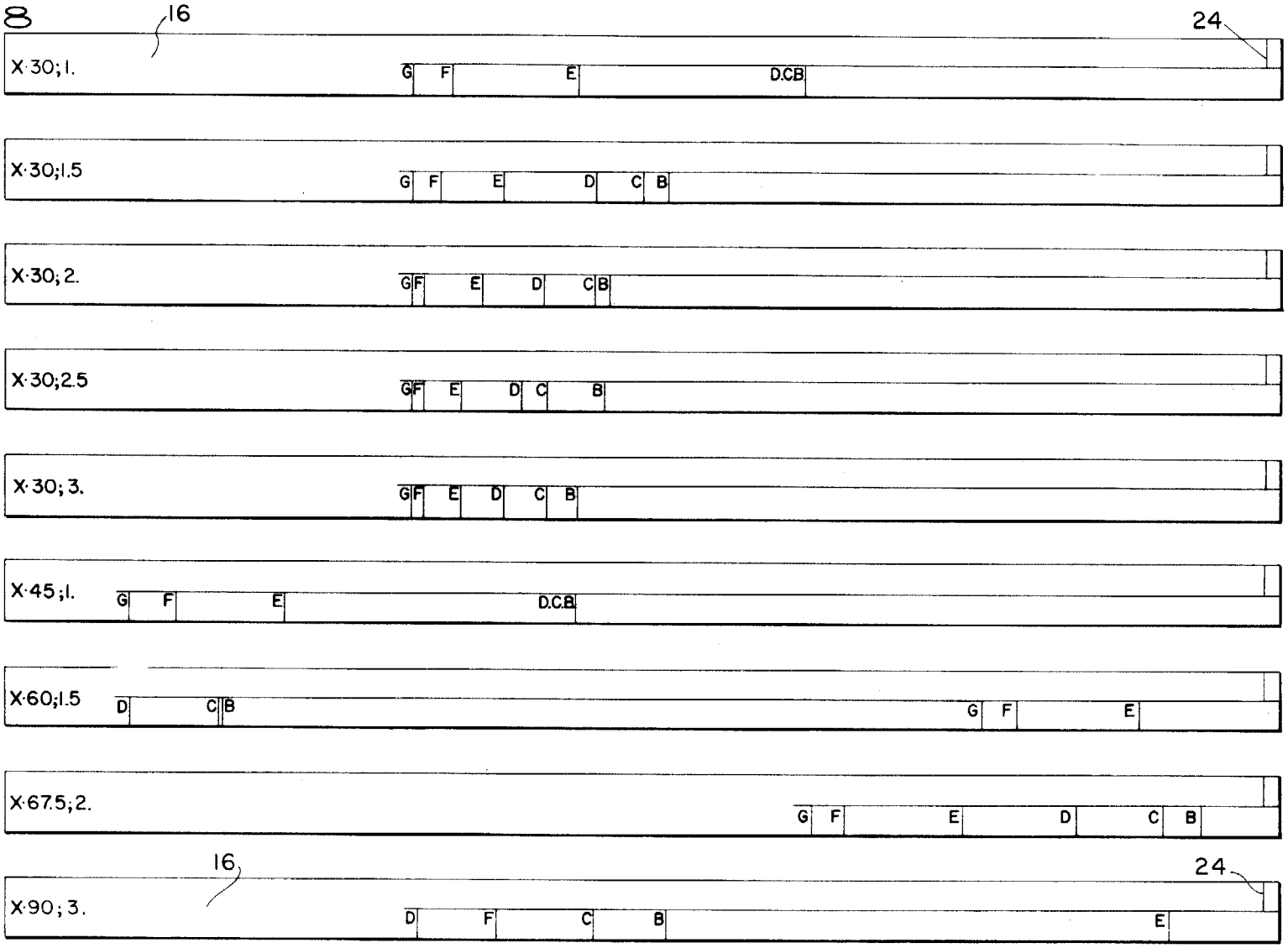

The scales X identified at 16 in FIG. 8, and located on sliding members similar to 10 and 13, are used in the development of intersections of round pipe, intersecting at the most commonly encountered angles of 90°, 67.5°, 60°, 45° and 30° from the main intersected pipe. Each X-scale has an index marker 24 at the extreme right of its upper half, and includes markers G, F, E, D, C, B, in that order at its lower half for scales through X–45 and X–67.5. On scales X–60 and X–90, the order of the markers changes for reasons to be described hereafter.

FIG. 6 shows a side elevational view of the first segment of an elbow having a straight section T and an angled portion thereabove which is divided into 12 equal parts A—G. The projected top view above the elevational view illustrates the method of dividing the circumference into the 12 equal parts.

From the FIG. 6A it will be observed that the horizontal projections of the lines A–G are in a progression of values that are proportioned to the diameter of the pipe in the respective order of 0, 6.7 percent, 25 percent, 50 percent, 75 percent, 93.3 percent, 100 percent. The applicant has discovered that this relationship holds true regardless of the diameter of the pipe, and that the true heights of the vertical lines A—G on the actual end segment bear a similar relationship among themselves. For example, the height of A, 0 percent by definition, and G is 100 percent of the greatest height vertical line, and the intermediate lines are a percentile of the greatest height, e.g., 6.7 percent. 25 percent, 50 percent, 75 percent and 93.3 percent. The applicant has determined this percentile relationship, and has incorporated the required proportions into the various scales and slides of his pattern rule so that the rule operator can go from the information given him directly to the pattern material and produce a finished pattern without the tedious and time consuming design and layout drafting work that, until the present invention, was an essential requirement of every sheet metal pattern. With the present invention the sheet metal worker himself may make his own patterns directly from the specified data to the pattern paper or directly onto the sheet metal to be worked and in shorter time than such could be prepared by a professional draftsman.

Construction of scales for pattern rule

FIG. 24 shows the means and method employed to physically lay out representative scales employed in the pattern rule of this invention. *The representative scales shown provide the means to register a particular number (as the logarithm of that number); and the relative relationship (manipulating or positioning) of these scales provides the calculating means for calculating the arithmetic results required.*

The D- and L-scales are layed off in logarithmic divisions. Each division mark is associated with a number and this mark is located from the left index a distance equal to the mantissa of the logarithm of that number.

The P-slide is layed off in the same manner as the D- and L-scale. The division C, D, B, E, F, and G, represent 25 percent, 50 percent, 6.7 percent, 75 percent, 93.3 percent and 100 percent in that order.

The E-slides are layed off in the same manner as the D- and L-scales, except from the right index. The division 2, 3, 4, 5, 6, 7, 8, and 9, are equal to the mantissa of the logarithms of the tangents of the angles equal to the angle of the first segment of each elbow. That being 45°, 22.50°, 15°, 15°, 11.25°, 9, 7.50, 6.42° and 5.62°, for 2 through 9 segments respectively.

The S-slide is layed off by associating to each division mark at left of index an acute angle such that the distance to the mark from the mark 10 is equal to the mantissa of the logarithm of the tangent of the angle. The angles being formed by 1.5 to 12 slope, thru 12/12 slope. Each division mark, at right of index, as an acute angle such that the distance between the marks at left and like marks at right is equal to the mantissa of the logarithm of the cosine of the angles of slopes having ratios of 1.5/12 thru 12/12.

The slides X and Y are layed off as scale D and L. All division marks, D, F, B, and E represents numbers determined by mechanical means as per attached drawing (FIG. 24B), and these marks are located from the right index a distance equal to the mantissa of the logarithms of that number. P-scale includes a left-hand index 20 that is useful when the right-hand index 21 would fall beyond the end of the scale being read.

EXAMPLE I

In laying out a pattern for an elbow, the following starting data is known:

| | | |
|---|---|---|
| a. Diameter of pipe | inches | 2 |
| b. Number of segments (pieces) in elbow | | 3 |
| c. Throat radius | inches | 2.5 |
| d. Degree of angle | deg | 45 |

The following procedure is then followed by using the pattern rule shown in FIG. 11 to produce the pattern of FIG. 14C for the elbow of FIG. 14A.

1. On a sheet of pattern material, lay out line X—X (FIG. 14C) having a length equal to the circumference of a 22-inch dia. elbow.

2. Divide line X—X into 12 equal parts (C/12), and identify the dividing line of each part thus formed by the letters A–G in the manner shown in FIG. 14C.
3. Draw a vertical line upward from each lettered line.
4. Set index of slide P (FIG. 11) to 2 (corresponding to the 2-inch dia.) on diameter scale D.
5. Set index on slide E-45 to B and read true length of vertical line (identified at B on the pattern) on scale L under the number of segments in the elbow (in this case, 3). The number directly read is 266, and the true length of B thus read is 0.266 inches.
6. Set index successively to each of the other letters C–G and read true lengths of each vertical line on the L scale as follows:

| | | |
|---|---|---|
| C=0.99 | E–2.98 | G=3.97 |
| D=1.98 | F–3.71 | A=0 (known) |

7. Lay out the true lengths of each line A—G on the proper vertical line in FIG. 14C, and connect these lengths by a curved line.
8. Measure down from line X—X a distance T which is determined from the throat radius. This dimension is obtained by the following steps:
   a. Set the index on slide P (FIG. 14B) to the desired throat radius (2.5 inches) on scale D.
   b. Set the index on slide E–45 to G on slide P and read the dimension T under the number of segment, 3, in the elbow. In this instance the dimension T is 0.495.
9. The distance T (0.495 inches) is then added below the line X—X and a new line X′—X′ is drawn parallel to line X—X. This completes the pattern for the first or end segments of the elbow pattern.
10. The pattern for the center segment of a three segment elbow pattern is obtained by folding the end segment pattern along line X′—X′ to obtain the full pattern for the center segment, which in FIG. 14C is the solid outline plus the dotted outline.

EXAMPLE II

In laying out a pattern for a T or intersection of round pipe, the following starting data is known:

a. Diameter of intersecting pipe ----------inches-- 3
b. Diameter of pipe intersected ----------inches-- 3
c. Angle of intersection ----------deg-- 90

The following procedure is then followed by using the pattern rule as shown in FIG. 12 to produce the pattern for the T fitting of FIG. 15A:

A. To produce the intersecting T.
   1. On a sheet of pattern material, lay out line X—X (FIG. 15B) having a length equal to the circumference of a 3-inch dia. intersecting pipe.
   2. Divide the circumstance line X—X into 12 equal parts (C/12) and identify the dividing line of each part by the letters A–G in the manner shown in FIG. 15B.
   3. Draw vertical line upward from each lettered line.
   4. Set the proper index on slide P (FIG. 12) to the diameter of the intersecting pipe on scale D (3 inches).
   5. Determine the correct X–90 scale to use by dividing i.e. 33=1, and then using the scale closest to the result, viz X–90; 1.
   6. Set the index on slide X–90; 1 to B and subsequently C–G on slide P and then read the true length of line on scale L below each respective letter B–G on slide X–90; 1, as follows:

| | | |
|---|---|---|
| B=0.202 | D=1.50 | F=0.202 |
| C=0.750 | E=0.750 | A & G=0.000 |

NOTE: The diameter of the intersecting pipe is 3 inches, so the length of D must be more than 0.150 and less than 15.0. The decimal point is thus set at 1.50 (all other lines are shorter). In 90° intersections, both A and G are zero by definition; for different diameters, the pattern may fall between the extreme outlines shown dotted and solid in FIG. 15B. The length of N (for nipple) below the line X—X is optional.

B. To produce the cutout pattern of FIG. 15C for the round pipe portion of the 90° T of FIG. 15A, the following steps are followed:
   1. Lay out a line X—X on a pattern sheet correspond to the circumstance of the pipe diameter of FIG. 15A and divide this line into 12 equal parts, and letter the dividing lines A–G as shown in FIG. 15C.
   2. Draw vertical lines up from line X—X at the location of dividing lines A–G.
   3. Set the proper index of slide P to the pipe diameter, 3, on scale D.
   4. Set the index of slide X–90; 1 to B, C, D on slide P, and read the true distances on slide L below the corresponding letters, as follows:

B=0.202 C=0.750 D=1.50

5. Lay out the distance B–D above line X—X and draw the X′—X′ parallel to X—X thru distance D.
   6. Measure the true lengths of distances B and C below line X′—X′ on the corresponding vertical lines B and C; point A in this instance is one line X—X and is equal to distance D below line X′—X′.
   7. Transfer the vertical lengths of A–C below axis X′—X′ to lines E–G above axis X′—X′ and label new points A′–C′ and connect point D′ and the lettered points thus located with a curved line.
   8. Set the index of slide P to the pipe diameter on scale D.
   9. Set the index of slide X–90; 1 to E, F, and G on slide P, and take readings on scale L below each correspond letter on slide X–90; 1, as follows:

E=0.75 0.202 G=0.0

10. Locate points corresponding to these readings up from line X—X and label them E′–G′.
   11. The area between curved lines A′–D′ and E′–G′ represents the cut out pattern for the pipe of the 90° T of FIG. 15A.

Figure 16A:
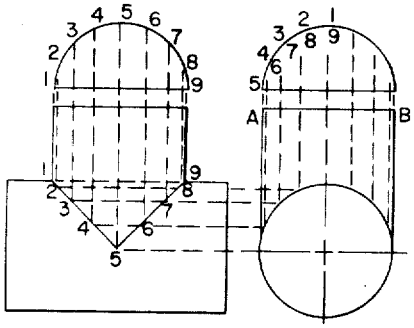
FIG. 16A is an orthographic drawing of an intersection or T-fitting similar to the fitting shown in FIG. 15A on which have been superimposed the type of projection lines required when making patterns by conventional methods.
Figure 16B:
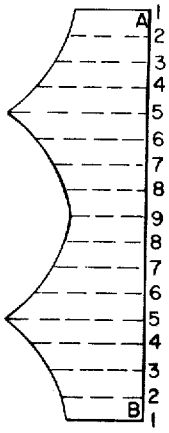
FIG. 16B is a design layout of the pattern for the intersecting T of FIG. 16A made by conventional methods from the orthographic drawings of FIG. 16A.
Figure 16C:
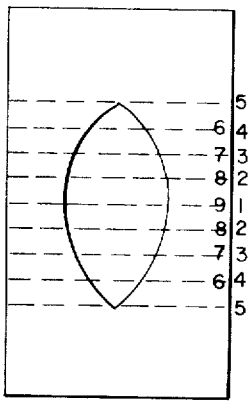
FIG. 16C is a design layout of the pattern for the intersected pipe of FIG. 16A made by conventional methods from the orthographic drawings of FIG. 16A.

The straight forward procedure used in Example II above contrasts very favorably with the conventional method shown in FIGS. 16A–C for producing a pattern by orthographic projection and auxiliary views and dimensional transfers.

EXAMPLE III

In laying out a pattern for a Y-branch, the following start data is needed:

a. Diameter of main line pipe ---------inches-- 5
b. Diameter of branch pipe ----------do---- 5
c. Angle of intersection to main line ---degrees-- 45

Figure 17A:
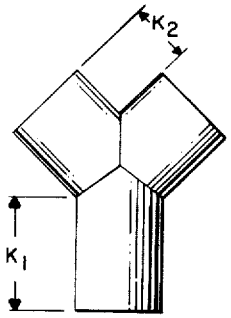
FIG. 17A shows a Y-branch in a sheet metal fitting.
Figure 17B:
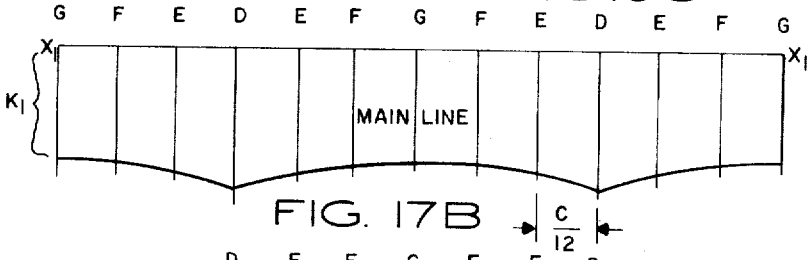
FIG. 17B is a design layout for a pattern of the main line portion of a Y-branch produced from the operation of sliding scales P and Y.
Figure 17C:
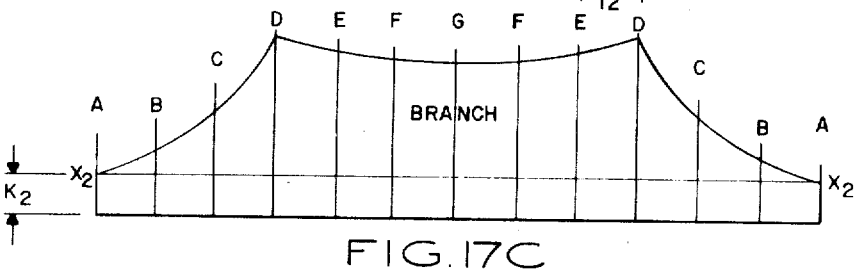
FIG. 17C is a design layout for a pattern of the branch portion of a Y-branch produced from the operation of sliding scales P and Y.

The following procedure is then followed by using the pattern rule shown in FIG. 13 to produce the pattern for the Y-branch of FIG. 17A:

1. On a sheet of pattern material, lay out line $X_1$—$X_1$ and $X_2$—$X_2$ the main line pipe and the branch pipe respectively.
2. Divide each of these lines into 12 equal parts, and identify the dividing line of each part formed by the letters D–G in the manner shown in FIG. 17B, and by the letters A–G in FIG. 17C.
3. Draw vertical lines outward from each lettered line on both circumference lines.
4. Set the proper index on slide P (FIG. 13) to the diameter of the main line (in this example 5 inches).
5. Set index on proper Y-slide (in this example Y–45; 1) to each of the letters B–G on slide P selectively, and take readings on scale L below each respective letter on slide Y-45; 1. These readings are as follows (decimal point location determined as hereinbefore described):

| | | |
|---|---|---|
| B 0.340 | D 2.50 | F 1.63 |
| C 1.25 | E 1.98 | G 1.46 |

6. Lay out the true lengths of each line A–G on the proper vertical line of each pattern (main and branch line) in FIGS. 17B and 17C and connect these lengths by a curved line. Note that lengths A–C are not used on the main line pattern, and A is zero on the branch line pattern.
7. Add the desired lengths $K_1$ and $K_2$ to the main and branch lines to form the crotch dimensions of the Y-intersection.

EXAMPLE IV

When any rise is given across the diameter of a pipe, the pattern or line of intersection along this line is obtained by:

1. Setting the right index on slide P to the given miter rise (such as M in FIG. 20A) scale D.
2. Setting the right index on slide E-90 to the lines B–G on slide P will give the true length of all intermediate lines directly below the index of slide E-90 on scale L.
3. If miter rise M is 4 inches, then the true lengths of lines B–G are read on scale L as follows:

| | | |
|---|---|---|
| B=0.268 inch | D=2.0 inches | F=3.73 inches |
| C=1.0 inch | E=3.0 inches | G=4.0 inches |

4. Complete the pattern using the same instructions as for elbows.

EXAMPLE V

In laying out a pattern for a cone, the following starting data is needed:

a. Diameter of base of cone (largest diameter) 6 inches.
b. Slope of sidewalls of cone (ratio of height to distance) 10 inches/foot.

Figure 18A:
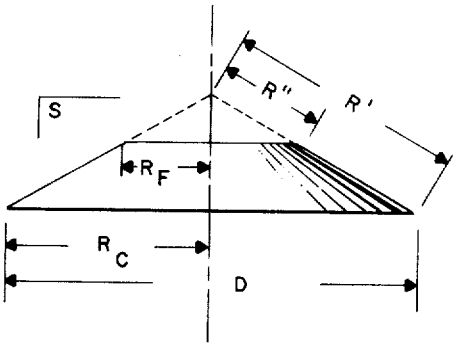
FIG. 18A shows the outline of a cone member and a frustum member in a sheet metal fitting.
Figure 18B:
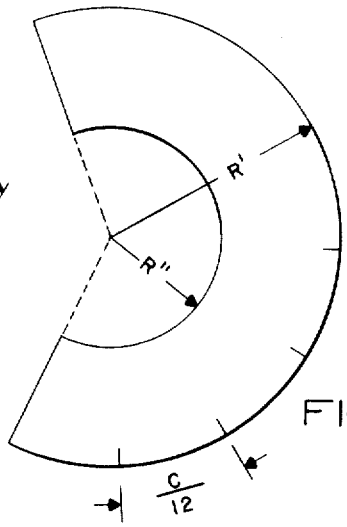
FIG. 18B is a design layout for a pattern of the cone and frustum of FIG. 18A produced from the operation of sliding scales P and S.

The following procedure is then followed by using the pattern rule shown in FIG. 10 to produce the pattern for the cone of FIG. 18A:

1. Set the proper index on slide P to the cone radius Rc (one-half the base diameter 6 inches or 3 inches) on scale D.
2. Set the index of slide S to letter G on slide P.
3. Under the desired slope (the small figures to the right of the index of slide S) of 10, read the radius R′ on scale L. This radius is 3.91 inches.
4. Scribe an arc on a sheet of pattern material using radius R′ as shown in FIG. 18B.
5. On the scribed arc measure off a segment equal to the circumference of the base of a cone of the diameter of 6 inches. This may be done in steps C/12 arcs, where $C=\pi D$, or 3.14×inches.

In laying out the pattern of a frustum of the cone, the only additional starting data needed is the radius $R_f$ of the small cone to be removed from the larger cone. (A frustum is a large cone from which a smaller cone at its top has been removed.) In this example this data is:

Radius of small cone $R_f=1$ inch

The following procedure is then followed to determine the dimension R″ and produce the pattern of the frustum FIG. 18B:

1. Set the proper index on slide P to the small cone radius (1 inch) on scale D.
2. Set the index of slide S to the letter G on slide P.
3. Under the same slope as above, 10 (the small figures to the right of the index of slide S), read R″ on scale L. This radius is 1.3 inches.
4. Add this radius to the pattern of FIG. 18B and scribe an arc to complete the pattern of the frustum of the cone.

For clarity of illustration of the above examples in FIG. 18A and B, the frustum is shown in solid lines and the complete cone is shown partially in dotted lines.

EXAMPLE VI

In laying out a pattern for a taper, the following starting data is needed:

a. Diameter of the large end _____inches__ 4
b. Diameter of the small end _____inches__ 2
c. Slope of side relative to central axis __inches/foot__ 3

Figure 19A:
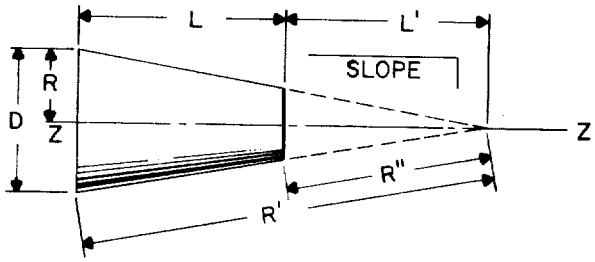
FIG. 19A is the outline of a tapered sheet metal fitting and a tapered frustum fitting.

The following procedure is then followed by using the pattern rule of FIG. 10 (same slides as for cone pattern) to produce the pattern for the taper shown in FIG. 19A. Only the P, S, and L scales are used in the development of pipe taper patterns.

Figure 19B:
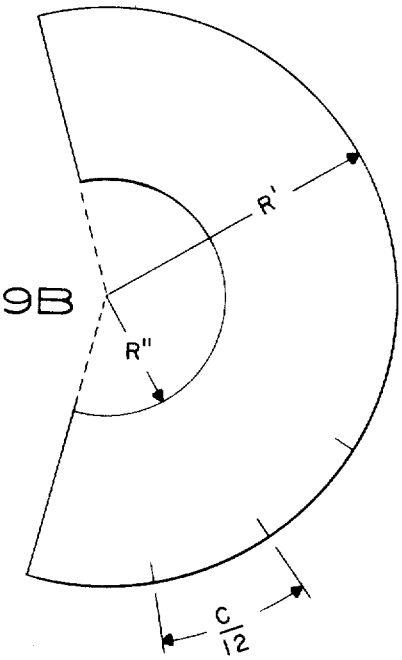
FIG. 19B is a design layout for a pattern of the taper and frustum of FIG. 19A produced from the operation sliding scales P and S.

1. On a sheet of pattern paper lay out the central axis line Z—Z.
2. Move the S slide until the large number to the left of the marker corresponding to the slope 3 is above the large end radus (4 inches diameter has radius of 2 on L scale).
3. Under the small number on slide S to the right of the index corresponding to the slope 3, read R′ to be 8.25 inches.
4. Under the index of slide S, read length of cone on slide L to be 8 inches.
5. To the radius (1 inch) of the small diameter on scale L align the same slope as used above (large numbers at left of index) which is 3.
6. Under the small number 3 on slide S to the right of the index read R″ to be 4.12 inches.
7. Under the index of slide S read the length L′ or the L scale to be 4 inches, and subtract this length from the total length of 8 inches to obtain 4 which is the length of the taper.
8. Lay out the taper pattern on a sheet of pattern material as shown in FIG. 19B by using the radii R′ (8.25 inches) and R″ (4.12 inches) to scribe arcs, and measure on the larger arc the circumference of the large end diameter (4 inches) of the taper, and complete the pattern by connecting the terminal lines from the center of the radii to the ends of the circumference measurement.

EXAMPLE VII

In laying out a pattern for a roof flashing, the following starting data is needed:

a. Diameter of the vent stack _____inches__ 4
b. Pitch of the roof _____inches/foot__ 5

Figure 20A:
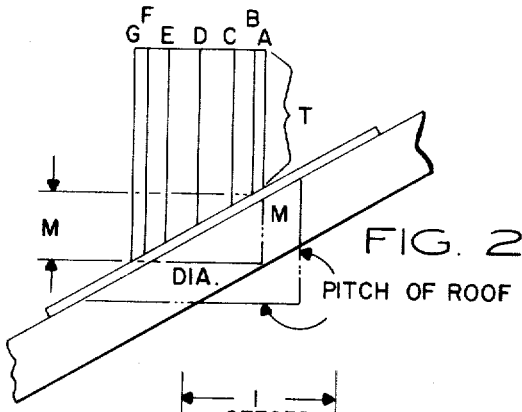
FIG. 20A shows a roof flashing in a sheet metal fitting.

The following procedure is then followed by using the pattern rule shown in FIG. 10 to produce the pattern for the roof flashing of FIG. 20A:

A. For the Vent Stack:

1. On a sheet of pattern material, lay out line X—X corresponding to the circumference of the stack having a diameter of 4 inches (in the same manner as done in FIG. 14C).
2. Divide the circumference into 12 equal parts, and identify the dividing line of each part formed by the letters A–G (as in FIG. 14C).
3. Draw vertical lines outward from each lettered line and measure up from line X—X a distance corresponding to the height of the line G above line X—X of FIG. 14C. These distances are obtained in step 4 below.

Figure 20B:
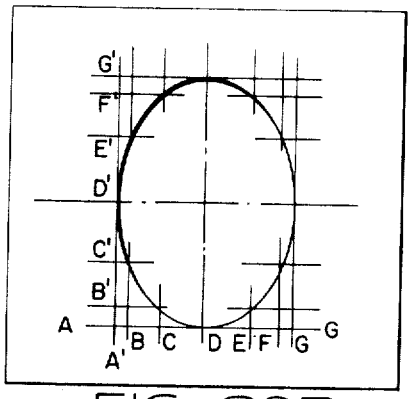
FIG. 20B is a design layout for a pattern of the roof flashing with cutout produced from the operation of sliding scales P and S.

B. For the Flashing:

1. Where a cutout is needed draw a horizontal line and a vertical line A–G and A′–G′ respectively, as shown in FIG. 20B.
2. Set proper index on slide P to stack diameter (4 inches) on scale D.
3. Set index on slide S to each letter A–G on slide P. Take three readings at each setting.

4. Under desired pitch on slide S (i.e. 5) read the length of lines from line X—X for each point in the stack pattern on scale L, as follows:

| | | | |
|---|---|---|---|
| A 0.000 inches | C 0.417 | E 1.25 | G 1.67 |
| B 0.112 | D 0.835 | E 1.56 | |

(For flashing straddling a ridge—the lengths of lines C–A are also used for E–G).

5. Under index on slide S read the horizontal distance on line A–G from A to corresponding letters on scale L, and locate these distances on FIG. 20B. These distances are:

| | | |
|---|---|---|
| A–G 4 inches | A–E 3 | A–C 1 |
| A–F 3.73 | A–D 2 | A–B 0.27 |

6. Under small number at right end of slide S denoting pitch, read under 5 and insert this vertical distance on the line A′–G′ from A to the corresponding letters. These distances are:

| | | |
|---|---|---|
| A–G 4.34 | A–E 3.24 | A–C 1.08 |
| A–F 4.05 | A–D 2.16 | A–B 0.29 |

7. Draw lines parallel to base line A–G from points on A′–G′. Also draw perpendicular lines from points located on base line.
8. Locate points of intersection of corresponding horizontal and vertical lines and connect with a smoothing curve.
9. Add desired width to each edge of cutout for flashing.

EXAMPLE VIIA

An alternate method of obtaining the vent stack dimensions and for understanding the theory involved is shown below:

The height, identified as M for miter rise in FIG. 20A, is related to the pitch of the roof as follows (and as shown in phantom lines in FIG. 20A):

$$M/\text{Vent Dia.}=\text{Pitch (5)}$$

Since by definition, a pitch of 5 means a slope of 5 inches per foot the equation becomes:

$$M/4 \text{ inches}=5 \text{ inches}/12 \text{ inches}$$

Now that all factors are in the same units (inches), the equation can be solved to obtain $$M=1.67 \text{ inches}$$

This dimension is now laid off on line G above the line X—X and the lengths of the other lines (B–F) are obtained by setting G on slide P to 1.67 and then setting the index of slide S sequentially to F, E, B, etc. and reading directly below on the L scale and laying out these distances above line X—X in the same manner as shown in FIG. 14C.

These dimensions are then read on scale L as follows:

| | | |
|---|---|---|
| B=0.112 | D=0.835 | F=1.56 |
| C=0.417 | E=1.25 | G=1.67 |

and these dimensions check with the dimensions obtained in Example VII, paragraph 4, as should be expected.

The desired full length of the vent stack is then obtained by adding the desired short side length below line X—X at point A (this corresponds to T in FIG. 14C and FIG. 20A).

EXAMPLE VIII

In laying out pattern for an offset, it should be borne in mind that offsets are made by joining two elbows of a predetermined degree together in reversed direction by a common reversed segment constructed of matching parts. The starting data required is as follows:

Given:
- a. Diameter of pipe
- b. Offset

Determine:
- c. Throat radius
- d. Number of segments

Figure 21A:
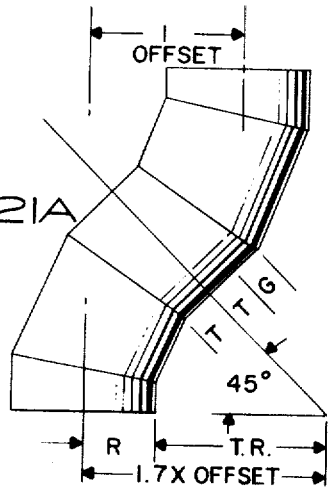
FIG. 21A shows an offset sheet metal fitting.

When slide E–45 is used to produce a pattern for the offset shown in FIG. 21A, the throat radius is equal to 1.7 times the offset minus the radius of the pipe. The throat radius is determined by setting the index of slide P to the throat radius on scale D and reading on scale L under the number of segments desired on slide E–45. If the throat to be added to the segment is too short for practical shop fabrication, then the next smaller number of segments should be chosen. In FIG. 21A it is assumed the proper number of segments for each elbow is three, but for the offset fitting the total number of pieces will be five, and will include two end segments, two full segments, and one connecting segment made of two end segments of a 45° elbow.

Figure 21B:
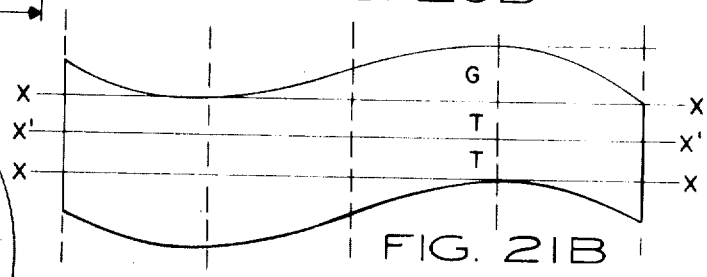
FIG. 21B is a design layout for a pattern of the central portion of the offset of FIG. 21A produced from the operation of sliding scales P and E–90°.

When the throat radius and number of segments have been determined, the offset pattern can be solved as any other 45° elbow with one exception. To eliminate a useless joint between the two elbows forming the offset, the two end segments of the joining elbows should be made in one piece, forming a "lazy S" pattern with the distance between the curved lines being twice T plus G. See FIG. 21B.

Figure 22:
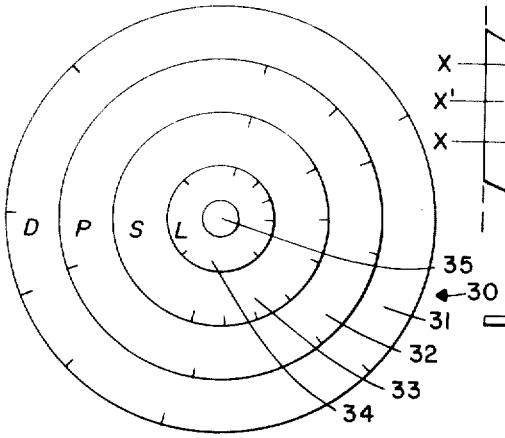
FIG. 22 is a plan view of a circular embodiment of the pattern rule of this invention.
Figure 23:
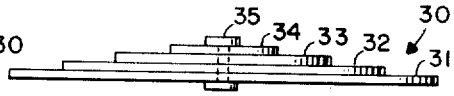
FIG. 23 is a side elevational view of the circular pattern rule of FIG. 22.

FIGS. 22 and 23 show an embodiment 30 of the pattern rule of this invention in circular form. The illustration shows scales D, P, S and L, identified at 31–34 corresponding to the scales used in FIG. 1. The central hub 35 in this construction is a conventional releasable fitting that permits relative rotation of the scales and permits removal of the scales such as S, that need to be replaced by the E-, X- and Y-scales for certain operations.

Figure 24A:
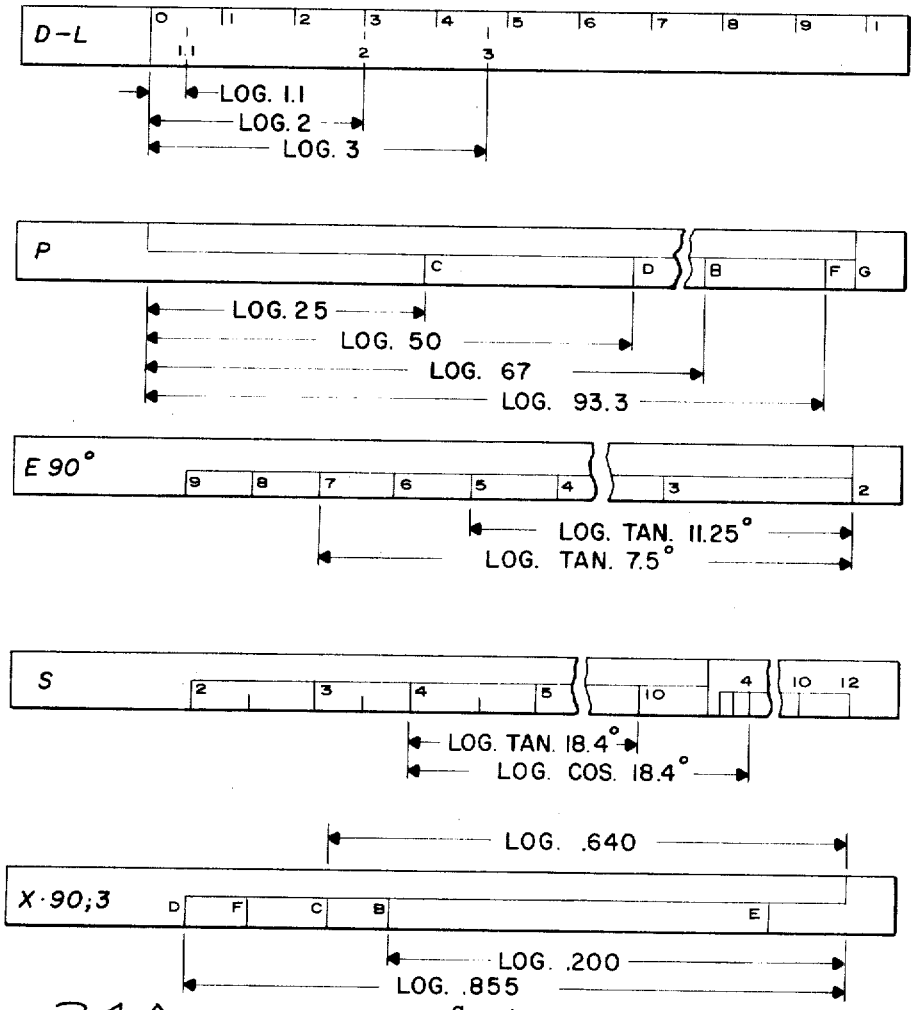
FIG. 24A shows the physical structure of various typical scales of this pattern rule and how the critical layouts in log form are placed on the scales.

In FIG. 24A, the actual procedure employed to locate the markers or datum lines on the various scales is diagrammatically illustrated.

The location of the numbered marks on the D- and L-scales is obtained by laying out the mantissa of the logarithm of that number in a manner similar to the C-scale of a conventional slide rule, except that the marks on the D-scale occupy only a portion of the rule and the marks on the L-scale comprise two complete sets of numbers 1 to 10, except for the initial 1 to 2 series on the left set of numbers. This latter arrangement is optional and both the D- and L-scales could include two or more complete sets if desired and if rules of proper lengths are employed.

The location of the lettered marks on the P-scale is obtained by laying out the ratios logarithmically that the locations of the pattern layout lines B–G occupy as explained relative to FIG. 6. For example, the distance of the letter mark C is the mantissa of the logarithm of the ratio that C bears to the diameter in FIG. 6 and this distance is measured from the left index mark. On a logarithmetic scale this is the same as the log of 25.0. Letter mark D is located at 50 percent of the logarithmetic distance of the scale, or at the log of 5. The location of lettered mark B appears to be an anomaly since its location in FIG. 6 is only 6.7 percent of the distance across the layout diameter, but the layout distances are based on the mantissa of the number and the mantissa is the same for 67.0 as it is for 67, so the log of 67 is used.

The E-sides are layed off logarithmically also, but in contrast to the previous scales, its numbered marks are layed off from the right index. The divisions 2–9 are equal to the mantissas of the logarithms of the tangents of the angles equal to the angle of the first segment of each elbow. These first segment angles for the E–90° scale are 45° (for a two piece 90° elbow), 22.50° (for a three piece 90° elbow) and 15°, 11¼°, 9°, 7½°, 6.42° and 5.62° respectively for segments 4–9.

The S slide has numbered marks that are layed off by associating to each mark at the left of the index an acute angle such that the distance to the mark from the mark 10 is equal to the mantissa of the logarithm of the tangent of the angle formed by the selected slope. The range of slopes commonly encountered is from 1.5 to 12 all the way up to a 12 to 12 slope. The numbered marks to the right of the index are located from their corresponding number at the left of the index by a distance equal to the mantissa of the logarithm of the cosine of the angle formed by the selected slope.

Figure 24B:
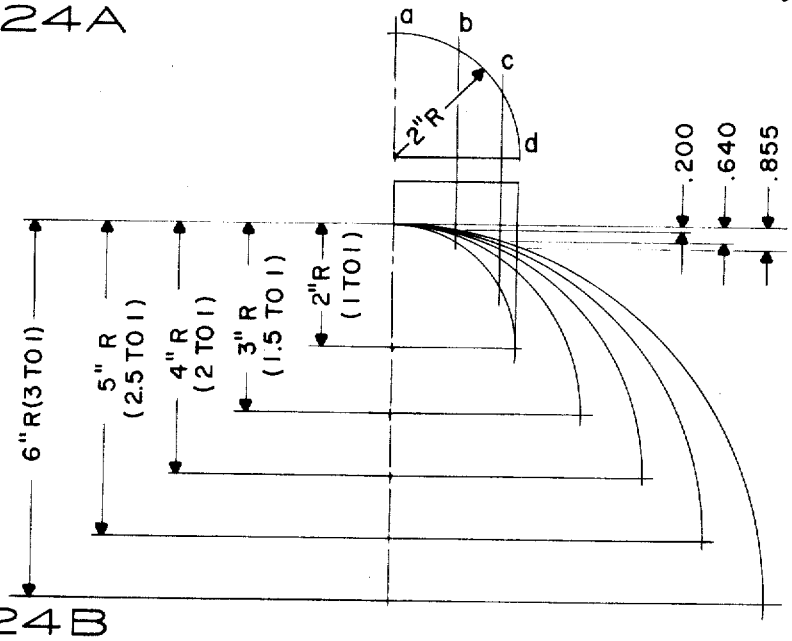
FIG. 24B shows how the critical heights of vertical (in this view) lines and obtained for placement on the X-scales.

The slides X and Y are also layed out logarithmically and all division marks B–F are obtained mechanically by the method shown in FIG. 24B. These marks are located from the right index a distance equal to the mantissa of the logarithm of that number. The example used in FIG. 24B involves a vertically extending 4-inch diameter pipe intersecting, at right angles, pipes of diameters 4 inches to 12 inches. From this example the lengths of the pattern layout lines may be taken and these lengths are representative of common requirements in pattern making. The lengths shown at the right in the figure are those required when a 4-inch diameter vertical pipe at 90 intersects a 12-inch diameter horizontal pipe, and these lengths are laid out logarithmically on the X–90° scale as shown in FIG. 24A.

Attached hereto and incorporated in this patent specification by reference is the instruction manual entitled, "Pattern Rule No. 12118 Manual" by Joseph E. Hannon published of even date with the filing date of this application, this instruction manual hereby forms a part of this patent specification.

From the foregoing description and examples it will be seen that there has been produced a device which substantially fulfills the objects of this invention as set forth herein. The invention is not limited to the exemplary construction herein shown and described, but may be made in many ways within the scope of the appended claims.

I claim:

1. In a pattern data slide rule, means for calculating true length lines of a circular fitting, comprising:

a. a frame;

b. a first fixed logarithmic scale in said frame having identified graduations indicative of said fitting diameter;

c. a first movable scale in said frame adjacent said diameter scale and movable relative thereto and comprising identified graduations indicative of pattern line pair locations around the circumference of said fitting; the layout dimension of each pattern line pair location graduation on said scale being equal to the logarithm of that percentage of the total diameter of the fitting that is crossed by a chord connecting said pattern line pair;

d. a second fixed logarithmic scale in said frame having identified graduations indicative of said true length pattern line;

e. a second movable logarithmic scale in said frame adjacent and between said pattern line pair location scale and said true length pattern line scale, and movable relative to each of these scales, and comprising identified graduations indicative of a physical characteristic of the particular type of fitting for which the pattern line is being calculated and selected as a function of the configuration of the fitting; and f. means on said movable scales for aligning with each other and with the adjacent fixed scale to identify below the graduation of the physical characteristic the true length pattern line on said second fixed scale when said first movable scale is indexed to the fitting diameter of the first fixed scale, and said second movable scale is indexed to the pattern line pair location on said first movable scale.

2. A pattern data slide *rule* as in claim 1, wherein the identified graduations *indicative of a physical characteristic* relate to the number of segments in the fitting.

3. A pattern data slide rule as in claim 2, wherein the layout dimension of said number of segments on said movable scale is equal to the logarithm tangent of the segment angle of the fitting.

4. A pattern data slide rule as in claim 1, wherein said identified graduations *indicative of a physical characteristic* relate to the slope of a conical fitting.

5. A pattern data slide rule as in claim 1, wherein said identified graduations *indicative of a physical characteristic* relate to the depth to the intersection line of a T fitting.

6. A pattern data slide rule as in claim 1, wherein said identified graduations *indicative of a physical characteristic* relate to the height of a pattern line above the intersection line of at least two intersecting fittings.

*7. In a pattern data calculator, means for calculating true length lines of a circular fitting, comprising:*

*a. a frame,*

*b. a first logarithmic scale in said frame having identified graduations indicative of said fitting diameter,*

*c. a second scale in said frame comprising identified graduations indicative of pattern line pair locations around the circumference of said fitting; the layout dimension of each pattern line pair location graduation on said scale being equal to the logarithm of that percent of the diameter of the fitting that is crossed by a chord connecting the pattern line pair,*

*d. a third logarithmic scale in said frame having identified graduations indicative of said true length pattern line,*

*e. a fourth logarithmic scale in said frame comprising identified graduations indicative of a physical characteristic of the particular type of fitting for which the pattern line is being calculated, and*

*f. means for aligning certain of said scales with each other for identifying the true length pattern line on said third scale.*

*8. A ptttern data calculator as in claim 7, wherein the identified graduations on said fourth scale relate to the number of segments in the fitting.*

*9. A pattern data calculator as in claim 8, wherein the layout dimension of said number of segments on said fourth scale is equal to the logarithm tangent of the segment angle of the fitting.*

*10. A pattern data calculator as in claim 7, wherein said identified graduations on said fourth scale relate to the slope of a conical fitting.*

*11. A pattern data calculator as in claim 7, wherein said identified graduations on said fourth scale relate to the depth to the intersection line of a T-fitting.*

*12. A pattern data calculator as in claim 7, wherein said identified graduations on said fourth scale relate to the height of a pattern line above the intersection line of at least two intersecting fittings.*

References Cited

The following references, cited by the Examiner, are of record in the patented file of this patent or the original patent.

UNITED STATES PATENTS

| | | | |
|---|---|---|---|
| 621,348 | 3/1899 | Keuffel | 235—70 R |
| 2,087,446 | 7/1937 | Proal | 235—70 A |
| 3,135,464 | 6/1964 | Quesenberry, Jr. | 235—70 R |

STEPHEN J. TOMSKY, Primary Examiner

U.S. Cl. X.R.

235—70 A